United States Patent [19]

Poque et al.

[11] Patent Number: 4,724,881
[45] Date of Patent: Feb. 16, 1988

[54] PNEUMATIC VEHICLE TIRE

[75] Inventors: Dionysius J. Poque, Aachen; Manfred Gerresheim, Würselen, both of Fed. Rep. of Germany

[73] Assignee: Uniroyal Englebert Reifen GmbH, Aachen, Fed. Rep. of Germany

[21] Appl. No.: 829,401

[22] Filed: Feb. 13, 1986

[30] Foreign Application Priority Data

Feb. 15, 1985 [DE] Fed. Rep. of Germany ....... 3505240

[51] Int. Cl.⁴ .............................................. B60C 9/22
[52] U.S. Cl. ................................. 152/527; 152/531
[58] Field of Search ............... 152/526, 527, 531, 535, 152/536, 537, 538, 451

[56] References Cited

U.S. PATENT DOCUMENTS

3,509,710  5/1970  Redmond ................. 152/527 X
3,850,219 11/1974  Snyder ........................ 152/531
4,284,117  8/1981  Poque et al. ................. 152/527

FOREIGN PATENT DOCUMENTS

2502072  9/1982  France ....................... 152/531
1274223  5/1972  United Kingdom ........ 152/527

*Primary Examiner*—Donald E. Czaja
*Assistant Examiner*—Ramon R. Hoch
*Attorney, Agent, or Firm*—Becker & Becker, Inc.

[57] ABSTRACT

A cap ply for the belt reinforcing member of a pneumatic vehicle tire. The heat shrinking reinforcing elements of the cap ply are oriented in the circumferential direction of the tire, and consists of monofilament threads or monofilament cords, and have a filament fineness of at least 250 decitex. These monofilaments fulfill a wrapping function, and at the same time are airtight. The monofilaments also prevent corrosion of the steel plies of the belt.

4 Claims, 4 Drawing Figures

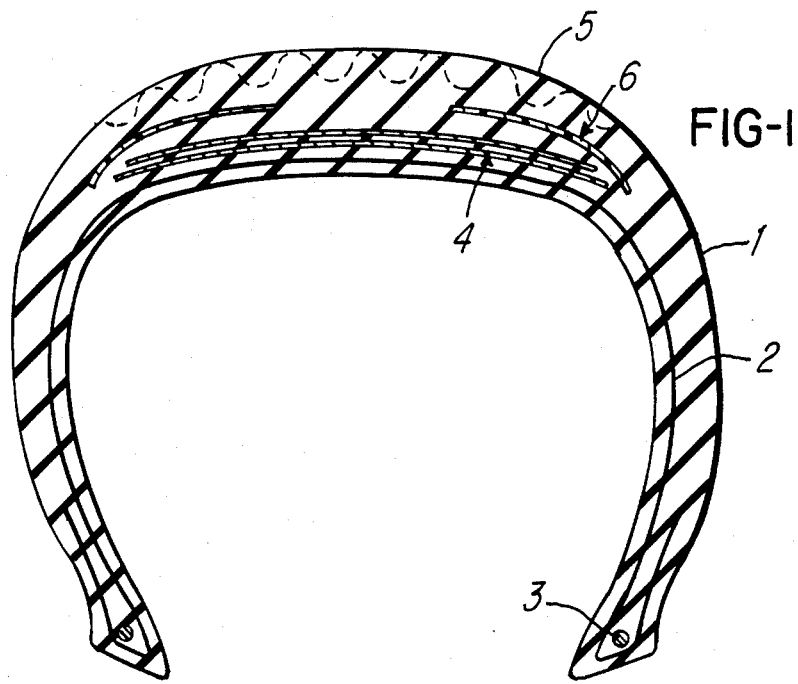
FIG-1
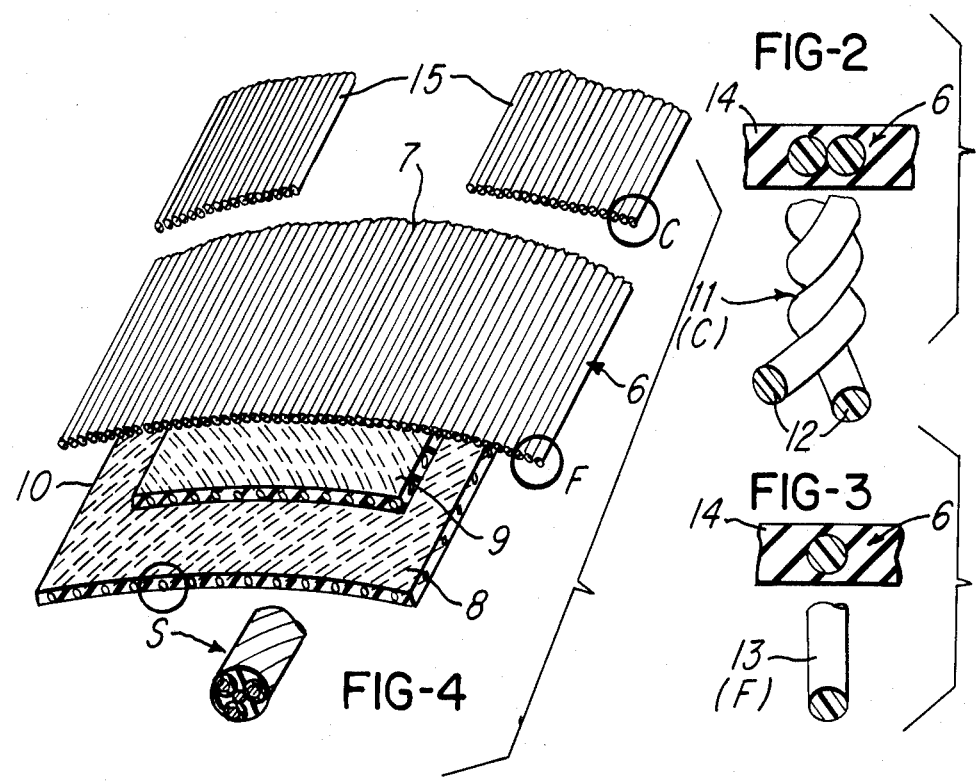
FIG-2
FIG-3
FIG-4

PNEUMATIC VEHICLE TIRE

BACKGROUND OF THE INVENTION

1. Field of the Invention

The present invention relates to a pneumatic vehicle tire having a radial carcass and a belt-like reinforcing member of at least two cord plies, at least one of which comprises steel cords. The cords of adjacent plies cross one another, and at least one of the cord plies has a width corresponding approximately to the width of the tire tread. Cap ply means are disposed radially outwardly of the belt member and are comprised of rubberized, non-metallic heat-shrinking reinforcing elements that extend parallel to one another in the circumferential direction of the tire, and extend more than completely around the belt member, at least in the edge regions of the latter, to securely hold these edge regions in place.

2. Description of the Prior Art

Pneumatic tires of this type are reinforced by multilayer belt members disposed in the region between the carcass and the tread. Depending upon the type and size of the tire, the reinforcing belt member comprises at least one steel ply and one fabric ply, or two or more steel plies.

To protect against separation of the edges of the belt, and to keep moisture from the belt member to the greatest extent possible, additional cap ply means are provided. Such cap plies comprise heat shrinking textile filaments or cords that are oriented in the circumferential direction of the tire. These cap plies extend around the belt member, and in addition impart advantageous properties to the tire. For example, a more favorable rolling resistance and a greater riding comfort are provided. In addition, such cap plies, which are known as safety belts, are very suitable for high speeds, and have a safety reserve.

Pneumatic tires of this general type are known, for example, from U.S. Pat. No. 4,284,117 Poque et al dated Aug. 18, 1981, the text of which is incorporated herein by virtue of this reference thereto. The reinforcing elements of this heretofore known cap ply comprise multifilament individual threads having twists of approximately 100 to 400 per meter.

These cap plies to a large extent protect against the effect of moisture. However, they do not adequately reduce the creepage of moisture over time.

An object of the present invention is to eliminate movement of moisture particles due to the more or less large creepage movement caused by the movement of air within the cord elements of the cap ply, and hence to also eliminate the adverse effect upon the belt plies held in place by the cap ply, or at least to keep such effects to a minimum and within permissible limits over a longer period of time. In this way, the steel cord elements of the belt plies are protected against reduction of the adhesion of rubber to steel, and the steel wires are protected against corrosion.

A further object of the present invention is to construct the additional cap plies of heat shrinking commercial filaments in such a way that the construction of the cords or the yarns themselves is airtight, and thus impermeable to moisture.

BRIEF DESCRIPTION OF THE DRAWING

These objects, and other objects and advantages of the present invention, will appear more clearly from the following specification in conjunction with the accompanying schematic drawing, in which:

FIG. 1 is a half radial section of a view showing a pneumatic vehicle tire having a monofilament cap ply disposed between the belt member and the thread;

FIG. 2 is a detailed view of a portion of a cap ply made of monofilament cord, and also shows an enlarged cross-section of the cord construction;

FIG. 3 is a detailed view of a portion of a cap ply made of monofilament yarn, and also shows an enlarged cross-section of the filament; and FIG. 4 is a schematic view of a two-ply belt having several cap plies.

SUMMARY OF THE INVENTION

The pneumatic vehicle tire of the present invention is characterized primarily in that the reinforcing elements of the cap ply means comprise monofilament yarns or cords having a filament fineness of at least 250 decitex; individual monofilaments themselves are not twisted.

As a result of these monofilament, the cap plies are provided with reinforcing elements in the form of monofilaments having a solid cross-section. These inventive reinforcing elements reliably assure that the movement of moisture particles in the cap ply is considerably reduced, and that the penetration of moisture particles into the metallic belt is prevented to the greatest extent possible.

As a result of the construction of the present invention, a good adhesion remains between the rubber and the steel for a long period of time, thus in turn keeping the danger of corrosion of the steel filaments of the belt very low.

Damage due to the effect of moisture is particularly prevalent during winter months, because the moisture contains salt, which is very corrosive. In such cases also the inventive monofilaments reliable and effectively prevent damage to the metallic cord elements.

The filament breaking strength that is required varies as a function of the use of the single filaments in the cap ply, of in accordance with whether the tire is small or large, and whether the tire is being driven at normal speed or high speed. For this purpose, commercially available yarns of polyamide, polyester, or rayon, or even fibers of aromatic polyamides or carbons can be used to the extent that their shrinking properties fulfill the required wrapping function. In this connection, the monofilaments can have finenesses ranging from 250 to greater than 3000 decitex.

The monofilaments themselves are not twisted. In the event a multi-filament cord is used, each cord, which comprises, for example, 2 to 7 single filaments, can have a slight twist of at least 60 turns/m.

The monofilaments can be used as reinforcing elements for cap plies that completely cover the entire belt width, or for cord strips that cover the edges of the belt and/or the central portion of the belt.

Further advantageous specific features of the present invention will be described subsequently.

DESCRIPTION OF PREFERRED EMBODIMENTS

Referring now to the drawing in detail, the pneumatic vehicle tire 1 of FIG. 1 essentially comprises a radial carcass 2 having beads 3, a belt-like reinforcing member 4, and a profiled tread strip 5. Disposed between the bolt member 4 and the tread strip 5 is at least one additional cover or cap ply 6. As illustrated in the exemplary embodiment of FIG. 4, each cap ply 6 comprises heat-shrinking reinforcing elements 7 which, due to their 0° orientation, extend completely around the belt member 4.

In the illustrated embodiment, the belt member 4 comprises two radially superimposed steel cord plies 8, 9. The steel cords comprise core or helix cord, as shown in the enlargement of the encircled portion S of FIG. 4. Each steel cord is formed of a wire core and three wrapped wires. The latter comprise fine wire filaments. The steel cords can also have a different construction. For example, they can comprise four or three wrapped wires, or two core wires surrounded by wrapped wires.

The orientation of the cords of the steel belt plies 8, 9 differ from one another. The cords of one ply cross the cords of the other ply, thus assuring a high strength, which is required for the stabilization of the radial carcass and the tread.

The additional cap ply 6 can comprise cords or yarns. In either case, the reinforcing elements are monofilaments that do not comprise a plurality of individual fine threads, but rather preferably comprise spun, fused threads having a solid cross-section.

FIG. 2 illustrates a monofilament cord 11 comprised of two individual monofilaments 12. Thus, this cord is provided with two filaments having a solid cross-section; see the enlargement C of the encircled portion C of FIG. 4. Seepage air that contains moisture constituents and that could creep along the individual monofilaments in the main force direction, due to the cross-sectional shape of the individual monofilaments, has no opportunity to accumulate with large quantities of moisture, or to penetrate into the steel cord plies. This is prevented by the single filament construction, which in addition is airtight.

FIG. 3 illustrates a monofilament yarn or thread 13. This monofilament also has a solid cross-section, and assures that the surface area available for attack by moisture constituents is much less than is the case with multi-filament threads; see the enlargement F of the encircled portion F of FIG. 4.

Depending upon the required packing density per dm, a more or less large number of not only the cord filaments but also the monofilaments are embedded in the rubberizing 14, which is produced, for example, by calendering the single filaments.

Such a monofilament cap ply is far less air permeable than are the heretofore known cap plies of multi-filament yarns or cords.

The application depends upon the strength of the filaments, and whether a wide monofilament cap ply 6 is provided that covers the entire width of the belt member 4, or whether monofilament cap plies 15 are provided that merely cover the edge regions 10 of the belt.

The filaments, for example, can be a polyamide, such as nylon 66, having a fineness of 500 decitex, an average filament thickness of 0.23 to 0.25 mm, a breaking strength of 24N, and a weight of approximately 5.0g/100m. A monofilament of polyamide of the same type of nylon having a fineness of 2000 decitex has a filament thickness of 0.46 to 0.5 mm. The breaking strength is 1 to 0N, and the weight is 20g/100m.

It is also possible to use, for example, polyester having a fineness of 1500 decitex, a filament thickness of 0.29 to 0.31 mm, a breaking strength of 60N, and a weight of 15g/100m.

Since all of these and other previously mentioned commercial filaments can be utilized, the production of the filaments can encompass all possible yarn finenesses of 250, 500, 1000, 1500, and up to 3000 or even greater if required.

For example, a monofilament of nylon 66 has a fineness of 1500 decitex, with the diameter of the monofilament being 0.4 mm. The measured moisture permeability of the filament cord is 0. The breaking strength is 96N. This is somewhere between the values found for multi-filament single threads of the types 940/1 and 1400/1.

The monofilament ply can be produced on a frame in such a way that no weft threads are present. The packing density can be as great as 90%, this being the ratio of the filament portion to the overall width in dm.

However, if the cap ply is made from monofilaments pursuant to the weaving process, weft threads are present. For such a ply of monofilament cord, it is possible to have a 1 to 0 filaments per dm.

A cord, for example, of monofilament nylon, of the type 500/3, has a strength of nearly 75N. A ply construction of the type 500/7 of single filament nylon has a strength of approximately 170N.

The weft and warp threads can have the same or different yarn finenesses ranging from 250 to 3000 decitex, with the principal strength direction being disposed in the circumferential direction of the tire. Possible applications include yarn plies, crossed yarn plies, cord plies, and crossed cord plies.

The present invention is, of course, in no way restricted to the specific disclosure of the specification and drawing, but also encompasses any modifications within the scope of the appended claims.

What we claim is:

1. In a pneumatic vehicle tire having a radial carcass and a belt-like reinforcing member having edge regions and at least two cord plies, at least one of which comprises steel cords; the cords of adjacent plies cross one another, and at least one of the cord plies has a width corresponding approximately to the width of the tire tread; said tire further the improvement in combination therewith which consists of:

cap ply means, such as a cap strip, cap ply and belt cover arrangement to be subdivided, as wide as, as well as wider than said belt-like member respectively, dependent upon type and size of tire, and said cap ply means including only solely monofilamentary means rather than multifilamentary elements, disposed radially outwardly of said belt-like member and comprised of rubberized, non-metallic heat-shrinking reinforcing elements that extend parallel to one another in the circumferential direction of the tire, and that extend around said belt-like member at least in the edge regions of the latter, to securely hold these edge regions in place and to prevent any separations arising between said belt-like member and carcass as well as any surrounding rubberized elements as well as to preclude any moisture penetration therein which would lead to rusting of steel cords; said reinforcing elements of said cap ply means consist of monofilamentary means having a monofilament fineness of at least 250 decitex to fulfill strength requirements; individual ones of said monofilaments are not twisted.

2. A tire in combination according to claim 1, in which said monofilamentary means are made of a material selected from the group consisting of polyamides, polyesters, rayon, aromatic polyamides, and carbon fibers.

3. A tire in combination according to claim 1, in which said cap ply means consists of several narrow strips.

4. A tire in combination according to claim 2, in which said cap ply means consists of crossed monofilamentary means, with the main direction of strength being the circumferential direction of the tire.

* * * * *